Nov. 25, 1930. G. F. SIMPSON Re. 17,883

WOVEN WIRE CLOTH COVERING FOR PRESSING MACHINE ELEMENTS

Original Filed Oct. 5, 1926

INVENTOR
GEORGE F. SIMPSON

BY ATTORNEYS.

Bohlber + Ledbetter

Reissued Nov. 25, 1930

Re. 17,883

UNITED STATES PATENT OFFICE

GEORGE F. SIMPSON, OF BOSTON, MASSACHUSETTS, ASSIGNOR TO THE PROSPERITY COMPANY, INC., OF SYRACUSE, NEW YORK, A CORPORATION OF NEW YORK

WOVEN-WIRE-CLOTH COVERING FOR PRESSING-MACHINE ELEMENTS

Original No. 1,639,458, dated August 16, 1927, Serial No. 139,732, filed October 5, 1926. Application for reissue filed October 15, 1930, Serial No. 488,955.

This invention relates to pressing machines of the platen type used in laundries and tailor shops and clothing manufacturing and has for its object a particularly simple and efficient means for distributing high pressure steam over the garment or other article being pressed and protecting such garment against scorching and against the formation of a shiny or glossy surface.

The invention consists in the novel features and in the combinations and constructions hereinafter set forth and claimed.

In describing this invention, reference is had to the accompanying drawings in which like characters designate corresponding parts in all the views.

Figure 1:
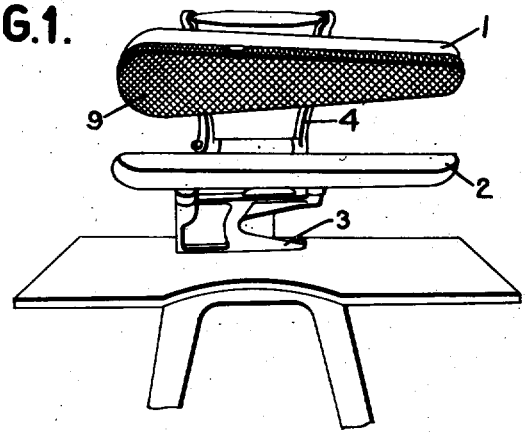
Figure 1 is an elevation, partly broken away and parts being omitted, of a pressing machine embodying my invention.
Figure 2:
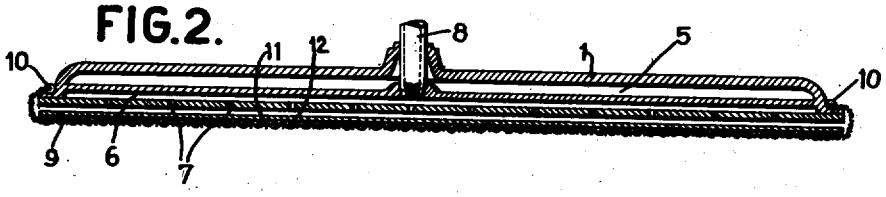
Figure 2 is a longitudinal sectional view through the press head.
Figure 3:
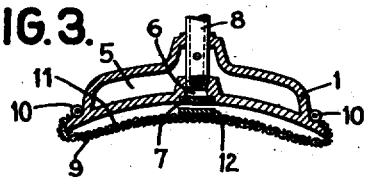
Figure 3 is a cross sectional view.
Figure 5:
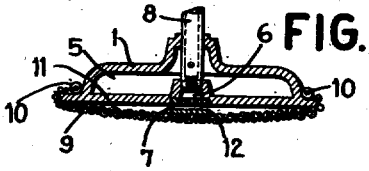
Figure 5 is a cross sectional view similar to Figure 3 showing my invention applied to a head having a flat pressing face.

It will be understood by those skilled in the art, that the pressing elements or platens of pressing machines are formed hollow and heated by steam supplied under relatively high pressure from a boiler, the steam in some instances being ejected from a central chamber in the pressing element through jet openings in the ironing face. The steam ejected at a relatively high pressure is also necessarily extremely hot and often times hot enough to scorch, burn or injure the garment, and also the pressing element heated by the steam is sometimes so hot as to scorch the garment, while it is only necessary that the steam ejected in the garment be moist in order to dampen the garment during the pressing operation.

By my invention, the steam applied at relatively high pressure is spread out and its force and temperature reduced so that the steam merely carries enough moisture to dampen the garment without scorching it and also by my invention, the head or ironing face is at the same time by the same means prevented from scorching or burning the garment.

This invention comprises generally, a flexible metallic covering for the pressing face of one of the pressing elements of the machine, usually the head, said covering being normally spaced apart from the pressing face and formed with openings therethrough throughout the area of the pressing face and being compressible against the face of a pressing element as the garment is pressed between them.

I have here shown my invention as applied to a standard type of platen press including a head 1 movable toward and from the buck 2 caried by a suitable frame 3, the head 1 being carried by a yoke or lever 4 of any well known construction, which yoke or lever is actuated in any well known manner. Both pressing elements are usually formed hollow for receiving a heating medium, such as steam.

My invention is here shown as applied to the head 1 which is formed with a heating chamber 5 and with a lengthwise channel or chamber 6 extending lengthwise and centrally thereof and within the chamber 5, the chamber 6 having jet openings 7 to the ironing face of the head. Steam is supplied to the chamber 5 in any well known manner and also to the chamber 6 as through a pipe 8. The flow of steam through the chamber 6 and jet openings 7 is controlled in any well known manner. Also air is oftentimes projected through the jet openings, the air being usually heated.

The flexible metallic means covering the pressing face of the head 1, as here shown, comprises a layer of fine wire mesh cloth 9 of some non-corrosive metal, the margins of this cloth being secured at 10 to the edge of the head 1 around the same. It is also secured to the head loose enough to allow the portion thereof over the ironing surface of the head to sag away approximately one quarter of an inch when the head 1 is not in contact with the garment on the buck 2. This flexible means also usually includes a second layer of wire mesh cloth 11 underlying the layer 9 or the portion only thereof opposed to the ironing face of the head 1, that is, the sheet 11 is coextensive with the ironing face and is unsecured at its margin to the head 1. The sheet 11 has no margins secured to the head and, therefore, the sheet 11 is coextensive only with the portion of the sheet 9 extending over the ironing face and is not coextensive with the entire sheet 9 including its margins, which are folded around the edges of the head 1 and secured thereto at 10. The openings of the sheet 11 opposite the jet openings 7 are either filled up with lead or solder or are covered by a strip of metal 12, this strip 12 acting as a deflector. The layers 9 and 11 act as a distributor for the steam or other fluid as air.

Figure 6:
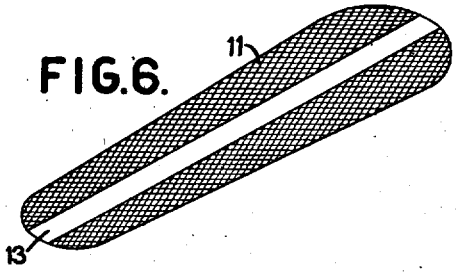
Figure 6 is a view similar to Figure 4 except that the steam deflector shown in this view is formed in the woven-wire cloth or sheeting itself by filling the interstices of the sheeting, throughout a section of its area, with lead or solder.
Figure 4:
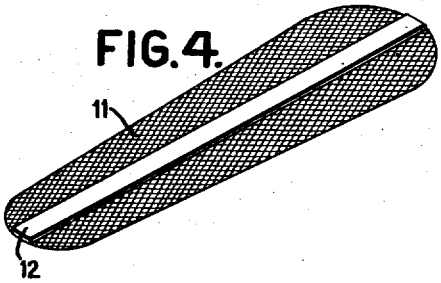
Figure 4 is an inner face view of the sheeting covering the face of the press head and showing the steam deflector.
Figure 7:
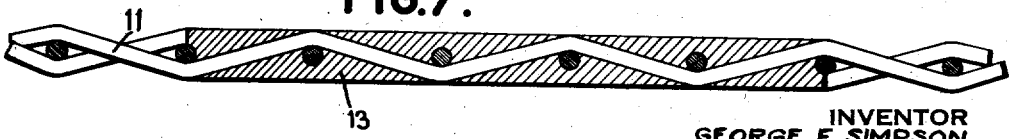
Figure 7 is an enlarged cross-sectional view of a piece of solder-filled woven-wire-cloth or sheeting like that shown in Figure 6.

In Figures 6 and 7 I show a deflector 13 formed or constructed integral with the woven-wire-cloth or sheeting 11 by filling the interstices of the sheeting throughout a section of its area opposite the line of jet openings 7 with lead or solder. In this manner I am able to construct a woven-wire-cloth or sheeting having a deflector for the purposes above described which at every point is the same thickness because the thickness of the lead or solder filled portion need not be greater than the thickness of the wire-cloth itself, see Figure 7.

By reason of these layers of wire cloth between the garment and the heated pressing surface of the head, there is no liability of scorching the garment and further as the heat is radiated through this grid or wire cloth, no shine or glossy appearance can be left on the garment after the completion of the pressing operation.

What is claimed is:

1. In a pressing machine, the combination of upper and lower pressing elements, one of which is movable toward and from the other and one being formed hollow for receiving a heating medium and provided with a line of jet openings through its pressing face for ejecting fluid, a metallic flexible sheet covering the pressing face of said element and spaced apart therefrom and formed with perforations throughout the greater part of the area thereof covering the pressing face forming a distributing chamber for the fluid ejected through said jet openings and said sheet having means in line with said jet openings for deflecting the fluid laterally through said chamber.

2. In a pressing machine, the combination of upper and lower pressing platen elements, the upper being movable toward and from the lower, the upper pressing element having perforations extending along its medial line through which fluid is ejected, a double layer of fine wire mesh cloth overlying the pressing face of the upper element, the outer layer being secured at its margins to the margin of the upper pressing element and being normally spaced apart from the ironing face and compressible against the ironing face of the upper element as the upper element coacts with the lower element to press an article thereon and the inner layer being substantially coextensive with the ironing face of the upper element and unsecured at its margins.

3. In a pressing machine, the combination of upper and lower pressing elements, one of which is movable toward and from the other and one being formed hollow for receiving a heating medium and provided with a line of jet openings through its pressing face for ejecting fluid, a metallic flexible sheet covering the pressing face of said element and spaced apart therefrom and formed with perforations throughout the greater part of the area thereof covering the pressing face forming a distributing chamber for the fluid ejected through said jet openings and said sheet having a deflector formed therein by filling the interstices thereof throughout a section of its area opposite the line of jet openings with solder for deflecting the fluid laterally through said chamber.

4. A pressing machine comprising a pair of coacting press jaws, one of said jaws being hollow and adapted to be heated by means of a fluid heating medium conducted to and discharged therein, and comprising a row of jet openings leading from the hollow portion of said jaw to the pressing face thereof through which said fluid is adapted to escape, in combination with a woven-wire-cloth covering the pressing face of said jaw, and a deflector in line with said jet openings, said deflector being formed in said wire-cloth by filling with solder interstices throughout a section of its area opposite said jet openings.

In testimony whereof I affix my signature.

GEORGE F. SIMPSON.